UNITED STATES PATENT OFFICE.

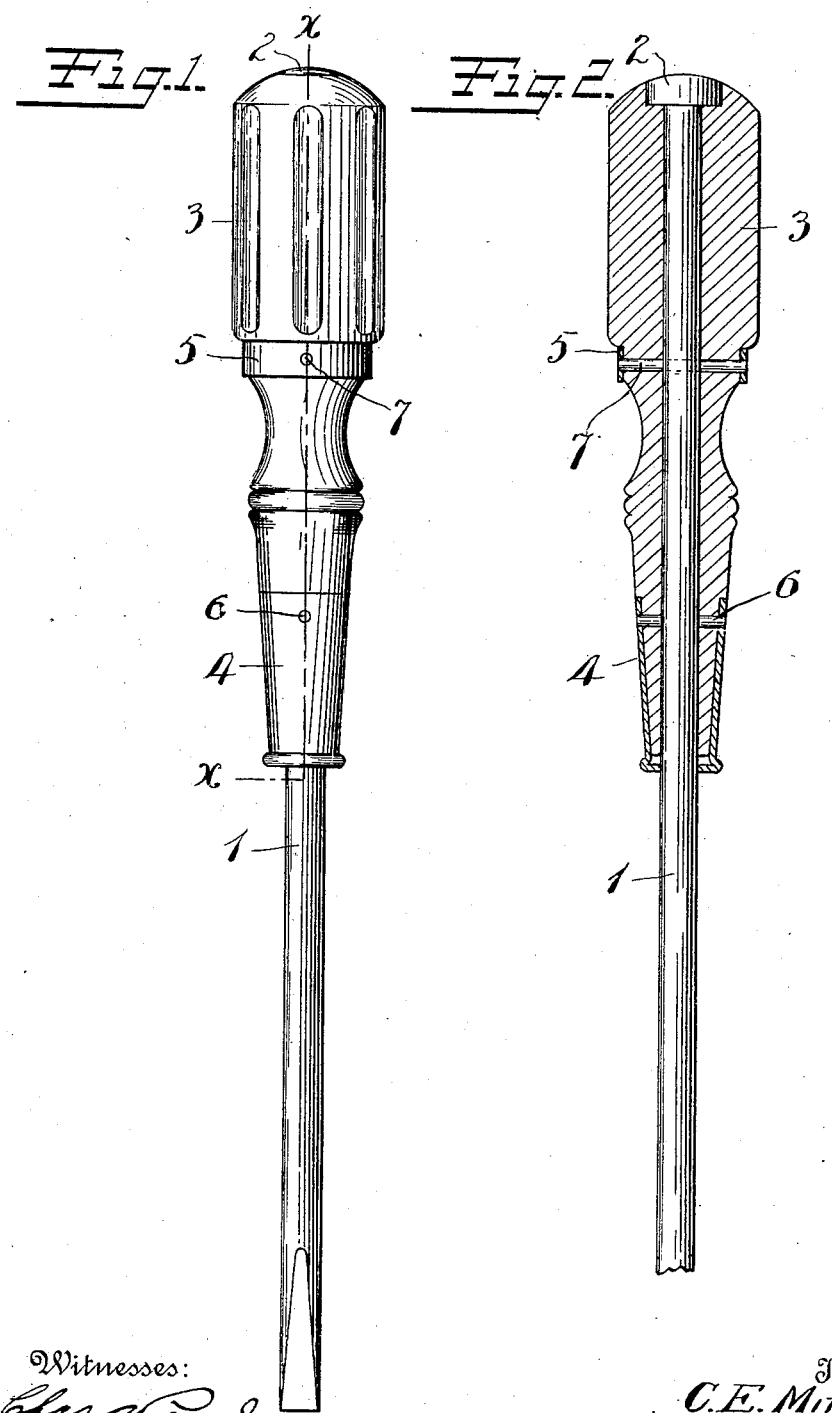

CHARLES E. MITCHELL, OF NEW BRITAIN, CONNECTICUT, ASSIGNOR TO THE STANLEY RULE & LEVEL COMPANY, OF NEW BRITAIN, CONNECTICUT, A CORPORATION OF CONNECTICUT.

SCREW-DRIVER.

No. 918,073.　　　Specification of Letters Patent.　　　Patented April 13, 1909.

Application filed May 13, 1908. Serial No. 432,572.

*To all whom it may concern:*

Be it known that I, CHARLES E. MITCHELL, a citizen of the United States, residing at New Britain, county of Hartford, State of Connecticut, have invented certain new and useful Improvements in Screw-Drivers, of which the following is a full, clear, and exact description.

My invention relates to improvements in screw-drivers, the object being to improve the same structurally, whereby the handle and shank are effectively connected and held against independent rotation, said connecting means being also employed as a handle-reinforcing means to guarantee against splitting when subjected to severe use.

In practice, the butt end of screw-driver handles are frequently used for starting screws by striking the screw head with the end of the screw-driver handle. In other instances, the end of the screw-driver is sometimes struck with a hammer. It is this sort of severe usage that frequently results in the cracking or splitting of the handle. By my improvement, much greater strength is added to this portion, so that it will more effectively resist this usage. In the past, in devices of this character, it has been customary to form serrations or wings upon the shank of the screw-driver, where it enters the handle or grip portion, these being designed to cut into the material to lock the parts against independent rotation. This frequently unduly strains the handle and results in cracking the same open. This wing construction also involves additional expense. By my invention this danger and expense is eliminated.

In the drawings, Figure 1 is a side elevation of the screw-driver complete. Fig. 2 is a similar view, the handle being in section on the plane of the line $x$—$x$ of Fig. 1.

1 represents the metal shank of the screw-driver, the same being round in cross section throughout, and provided at its butt end with a head 2 preferably formed inteeral therewith and circular in outline, though the shape is immaterial.

3 represents a grip portion or handle of suitable form, tapered toward its forward end to receive a ferrule 4.

5 is a ring located upon the handle intermediate the ends thereof in such a manner as to reinforce said handle or grip against splitting. This ring 5 is arranged just below an abutment shoulder on the handle provided to prevent said ring from sliding up when pressure is applied.

6 is a pin passing through the ferrule 4, the forward end of the handle 3 and the shank 1. 7 is another pin passing through the ring 5, handle 3 and shank 1.

In assembling the parts, the handle 1 is bored to receive the shank. The latter, being preferably smooth and regular externally, may be readily inserted into the handle 1 without danger of splitting the same, and yet snugly enough to prevent any danger of looseness. Borings are then made for the pins 6 and 7. These pins 6 and 7 perform several functions. They hold the respective external reinforcements 4 and 5 in place, said reinforcements permitting the ends of said pins to be headed up effectively so as to not pull through the material of the handle. The pins also act as keys to prevent the shank 1 from turning in the handle 3. They also act as means to prevent the handle 3 sliding longitudinally on the shank 1.

Substantial economies are attained by this arrangement, and the finished product is superior in strength and appearance. If the user desires to pound with the handle 3, he may do so with very little danger of splitting or injuring the same. Furthermore, if the screw-driver is struck on the end with a hammer, it withstands such blows most effectively.

The ferrule 4 should preferably fit snugly upon the shank 1 as well as the inclosed end of the grip 3. The head 2 on the shank is preferably of substantial thickness and is likewise preferably squared up on its lower side, the rear end of the grip or handle 3 being recessed to receive said head 2, so that the same will lie substantially flush with the rear extremity of said handle.

What I claim is:

A screw driver comprising a round shank having a head at one end, a handle having a central bore adapted to receive said shank and being counterbored to receive said shank head, the forward end of said handle being tapered, a ferrule overstanding the extreme forward end of the handle, a holding pin passing through said ferrule, handle and shank, a reinforcing ring arranged at a point intermediate the length of the handle and of greater diameter than the diameter of said ferrule, an abutment shoulder on the handle just above said ring and a holding pin passing through said ring, handle and shank.

CHARLES E. MITCHELL.

Witnesses:
W. J. WORAM,
H. S. WALTER.